Patented Apr. 30, 1929.

1,711,110

UNITED STATES PATENT OFFICE.

HENRY DREYFUS, OF LONDON, ENGLAND.

PROCESS OF TREATING CELLULOSIC MATERIAL.

No Drawing. Application filed October 31, 1924, Serial No. 747,054, and in Great Britain September 25, 1924.

This invention relates to a process for the treatment of wood pulps and like cellulosic materials to produce cellulose of a degree of purity and reactiveness which will enable it to be satisfactorily employed in lieu of cotton or cotton cellulose for the manufacture of high quality cellulose acetates, nitrocellulose, viscose, ethyl, methyl or benzyl cellulose or other cellulose esters or cellulose ethers. The invention also comprises the production of cellulose acetates or other esters or ethers of cellulose from cellulose thus made or produced.

In particular the invention aims to produce from wood pulps and like cellulosic materials cellulose of high purity and reactiveness for the manufacture of cellulose acetates, and will be described principally in this connection, but the cellulose obtained may be employed for the manufacture of other cellulose derivatives such as referred to, or for other uses.

In the term "wood pulps" I include not only chemical wood pulps such as soda pulps, sulphate pulps, sulphite pulps, or others obtained from chemical treatments of wood or like cellulosic materials such as bamboo, reeds, esparto and other grasses and so forth, but also so-called mechanical wood pulps.

For the manufacture of cellulose acetates and other cellulose esters it has hitherto been the general practice in the industry to employ cotton, cotton paper or cotton cellulose.

Many attempts have been made to use wood pulps for the purpose, but without success. It is true that an acetylation takes place, but the acetylations are very unsatisfactory in consequence of the fact that the wood pulps are much more indifferent or resistant to acetylation than is cotton, and it is found that even under the best conditions of acetylation, instead of getting useful acetylation solutions with the wood pulps, one obtains acetylation solutions in which, under the microscope, the cellulose is seen to have retained most of its original fibrous structure except for considerable swelling and there is little or no difference between the acetylation solutions obtained with the different existing wood pulps. One obtains gelatinous masses in certain cases, whilst in other cases a great deal of insoluble matter still remains in the acetylation solutions, quite apart from many other defects, such as cloudiness etc.

If it is attempted to use any of the existing chemical wood pulps, e. g. soda pulp, sulphite pulp, sulphate pulp or mechanical wood pulp or any others, unsatisfactory results are obtained on acetylation. The pulps in fact give acetylation solutions which are full of fibers or are cloudy, and in short are impossible from a technical point of view. This is one of the reasons why wood pulp has not been used in practice for the manufacture of cellulose acetates.

Even boiling with glacial or dilute acetic acid before acetylation does not obviate the difficulty nor does a pretreatment of the pulp with glacial acetic acid and sulphuric acid before adding acetic anhydride before the acetylation. Thus, for example, even if one first treats the pulp with a mixture of glacial acetic acid and 5, 10 or 15% of sulphuric acid relatively to the weight of the pulp and then effects the acetylation after making up the mixture to, say, 800 parts acetic acid, 15 parts sulphuric acid and 300 parts of acetic anhydride per 100 parts of wood pulp, the resulting product is not satisfactory.

Even extraction of the pulps with solvents such as alcohol, ether, benzol or toluol (the latter at 135° C.) to eliminate resins does not obviate the difficulties and gives similar bad results, and even treatment in a wet state with chlorine gas according to the usual methods to eliminate ligno cellulose has not the desired effect. Mechanical wood pulps are still worse than chemical wood pulp. Even mechanical wood pulp, i.e. pulp which has not undergone any chemical treatment, does not give the desired acetylation or esterification effect, after it has been treated wet with chlorine gas and digested with alkaline sulphite of soda to remove excess of chlorine and then bleached with calcium hypochlorite. Whilst this gives a white, bulky product of small fibres, the product does not give the desired acetylation or esterification effect.

The main object of the present inventor was to find out a process or means which would enable wood pulps to be made useful for acetylation or esterification purposes so as to give similar products to those which are obtainable with cotton and like pure celluloses.

In considering the question of what causes might operate towards rendering the wood pulps unsuitable for acetylation or esterification, the present inventor was disposed to think that in the case of soda pulp and like pulps this might be due in part to some action of alkali on the cellulose, especially as he found that when cotton cellulose is treated with relatively concentrated solutions of caustic alkali, the cellulose is still more resistant to acetylation or esterification, that is to say a mercerized cellulose is very bad for esterification. Further he found that any treatment of cotton cellulose by boiling with relatively high concentrations of alkali, e. g. over 5% and especially 10% to 20% has a very bad effect and gradually dissolves a large proportion of it by depolymerization or degradation. This is rather curious, inasmuch as in the manufacture of so-called soda wood pulp or of sulphate pulp, which I class in about the same category, very substantial quantities of alkali are used which a priori should have a very deleterious effect on the cellulose of the pulp in view of the known detrimental effect of relatively concentrated alkali on cotton cellulose, so that one might assume that soda pulp and sulphate pulp so prepared would be very bad. However, it seems as though the cellulose of wood treated with the relatively high concentrations of alkali employed in making soda pulp is in a sense protected from the action of the alkali, inasmuch as the large amount of ligno cellulose and resins present in the wood and which have to be removed are attacked before the cellulose. However, although the cellulose of the wood appears to be thus protected, it is found that the soda wood pulps and like pulps of commerce are nevertheless not capable of giving satisfactory products of acetylation, esterification or etherification.

This is probably due in part to the fact that the quantity of caustic alkali generally used for making soda wood pulp is substantially under what is necessary even to remove ligno cellulose, resin and other impurities, especially as the loss in weight of wood pulp is about 40 to 50 per cent when the wood is submitted to the soda or sulphite process in order to make a commercially useful wood pulp, so that when soda wood pulp is finished it still contains a considerable amount of substances which are not cellulose or not true cellulose; it is also probably due to the fact that the cellulose is in a condition or state of constitution in which it resists acetylation or esterification. The users of soda pulp, like those of sulphite pulp and the other wood pulps, of course only want a white product having the qualities and properties required for paper making, and the wood pulp manufacturers, being paid on weight and therefore wanting high yields in weight, of course leave as much material as possible in the pulp so long as they get a white pulp accepted by the users. This is proved by the fact that when commercial soda pulp, sulphate pulp or even sulphite pulp is treated by boiling it with caustic alkali under similar conditions to those employed in the manufacture of the pulps, e. g. with 5%–10% or higher concentrations of the alkali, a substantial decrease in weight takes place, for example of 25%–50% and even more, that is to say subsequent boiling with alkali again gives a loss in weight on these wood pulps; boiling of them with water alone under the same conditions does not cause any substantial loss in weight, even under pressure. Further the applicant has found that the more the concentration of the caustic alkali is decreased in such a subsequent treatment of soda pulp, sulphate pulp or sulphite pulp, viz. under 5%, e. g. to 2½%, 1% or ½% or ¼%, the less is the decrease in weight, or rather with these lower concentrations, e. g. of 1% to ½ or ¼ per cent one gets down, after some boiling, to a constant weight, which only decreases immaterially by prolonged boiling. This is a proof that as in wood pulp manufacture, where pressure and even high pressure is used, such concentrations as 5%, 7%, 10% or more of alkali are used, the wood pulp would be greatly affected and an enormous loss in weight result if the alkali were used in quantities sufficient to eliminate everything but the cellulose, and the same thing would apply even if the concentration of alkali were reduced to say about 2½%, working under pressure. It therefore seems to follow that soda and like wood pulps are made with less than the requisite quantity of alkali to eliminate all other non-cellulose constituents and that the ligno cellulose and other non-cellulose constituents must have a protective influence to protect the cellulose against alkali. This is also proved by the fact that the pentosan content of these wood pulps, which is about 3–5% generally, and which, it is believed, has to a certain extent an influence on the esterification qualities of the pulp (inasmuch as the less pentosan there is present the better does acetylation or other esterification go) is about the same for sulphite pulp and soda pulp, whereas the applicant has found that the pentosan of the wood pulps can be removed or substantially reduced by treating them with caustic alkali in the alkali extraction step of his process herein described, so that it is to be supposed that if excess alkali had been used in the soda pulp process these pentosans, such as furfural etc., would be present no longer or only to a substantially less extent, for example of only about ½%–1% instead of 3% to 5%, as the applicant has found by treating the soda pulp or sulphite pulp containing 3–5% of pentosans with caustic alkali of e. g. 1, 2½, 5, 10 or 20%, the furfural or pentosan content goes down to these low percentages.

Whatever the reason may be, however, the fact remains that it has not hitherto been possible to obtain useful acetylation or esterification products from wood pulps, whether soda pulp, sulphate pulp, sulphite pulp, mechanical wood pulp or any other wood pulp known up to the present, nor to prepare from such pulps by any of the known processes of purification a useful product capable of being employed satisfactorily for the manufacture of cellulose acetates or other cellulose esters. It has been found that there are other considerations which come into account and which must have escaped attention up to the present. It has been found that it is not only a question of effecting or attaining a high or improved standard of purification, but that the cellulose itself of the wood pulp exists in a condition in which it resists acetylation or esterification, and that by a special treatment it has to be transformed into such a state or condition, perhaps changed in its molecular nature, as to make it reactive or responsive to esterification.

This view is supported, it is believed, by the fact that when one examines under the microscope acetylation products in acetylation reaction mixtures or acetylation "solutions" produced from wood pulps which have not been subjected to the treatment forming the subject of the present invention, a great deal of swollen fibre is observed but no true solution.

After long investigation it has now been found that by subjecting the wood pulps of commerce or any other wood pulps—especially those whereof the wood or raw material contained ligno cellulose and/or pentosan, which have been removed or substantially removed—to treatment with caustic alkali or similarly acting agents under suitable conditions and afterwards with fatty acids, such as acetic acid (hereinafter termed lower fatty acids) the cellulose can be transformed into a condition in which it is more amenable for acetylation or esterification and gives useful acetylation or esterification solutions. The principle has been established that by treating said wood pulps with alkali or similarly acting agents under suitable conditions, followed by an acid treatment, the treated pulps can be perfectly used for acetylation or other esterification or etherification. The acid treatment following the treatment with alkali or similarly acting agents is necessary, and especially in cases where relatively high concentrations of alkali are used for the former treatment. The conditions of the treatment with alkali or similarly acting agents can vary according to the power and concentration of the agent used. Using for example caustic alkali solution of about 10% to 20% the result or effect can be obtained by conducting the alkali treatment of the combined process in the cold, this being the more necessary, as by boiling the cellulosic material with such alkali solution one would cause partial or complete destruction of the cellulosic molecule and substantial loss in weight; indeed this could occur by boiling the wood pulp or cellulosic material with less than 10% concentrations of caustic alkali solution, e. g. 5% concentrations. On the other hand, if concentrates of caustic alkali of less than 10%, and especially of from about ¼% or ½% to about 3%, be used, this treatment may be applied as a repeated or prolonged treatment in the cold or at moderate temperatures or as a treatment at lower temperatures than boiling, but is preferably conducted by boiling with the alkali solution for several hours, even one hour to two hours or even substantially less than an hour. The alkali should be used in a substantial excess for the alkali treatment, for example, to give some idea, in using concentrations of about 3% to ¼% one may employ about 20 to 40 times weight of alkali liquor relatively to the weight of pulp or cellulose treated, or with concentrations between about 10% and 3%, about 10 to 20 times weight of alkali liquor relatively to the weight of pulp or cellulose treated. For concentrations of alkali solution between about 3% and about 10%, intermediate conditions of temperature may be chosen. This however does not exclude that, even with higher concentrations than 10%, heating or boiling can take place, but, as explained, not with advantage, by reason, amongst other things, of depolymerization and loss in weight.

The treatment, preferably by boiling or heating with the low concentrations of alkali, such as from about ¼% to about 3% concentrations, and preferably about ¼% to about 1% concentration is better inasmuch as it practically does not affect or depolymerize the cellulose molecule.

The treatment with alkali or similarly acting agents improves the properties of the cellulose so that after subjection to the treatment with fatty acids such as acetic acid, preferably heating or boiling with acetic acid (glacial or diluted but preferably glacial) or prolonged treatment therewith in the cold, the resulting cellulose will give very satisfactory products on acetylation or other esterification or etherification. Especially is this the case when the lower concentrations of caustic alkali, viz of from about ¼% to about 3% and especially ¼% to about 1% are employed for the alkali treatment as before referred to.

It has been found for example that celluloses thus prepared and subjected to acid treatment as mentioned, for instance boiling with glacial acetic acid for from one to several hours, will give on subsequent acetylation cellulose acetates of very high quality and viscosity and that the acetylation solutions obtainable are just as good as and even better and clearer than cellulose acetates made under otherwise similar conditions with cellulose such as cotton. That is to say, acetylation solutions obtainable with such celluloses can have at least as high viscosity and as high or even higher clarity in many respects as the best acetylation solutions hitherto obtainable with cotton and like cellulose, when acetylated under otherwise similar conditions.

If the alkali treatment is performed with caustic alkali concentrations of say about 10% with boiling or even at lower temperatures, or with higher concentrations of up to about 20% or more, even in the cold, the subsequent treatment with acid is especially necessary, because it has been found that the resulting cellulose acetylates even worse than if the alkali treatment were omitted. There are of course intermediate stages to which this applies in a less and less degree, for example going gradually down to alkali concentrations of 5% and even less. However, higher alkali concentrations over about ¼% to 3% are anyhow less advantageous, and the best results are obtained with low alkali concentrations of under about 3% and preferably of about ¼% to about 2%.

Instead of caustic alkali, i. e. caustic soda or caustic potash, one may employ for the treatment similarly acting substances, such for example as sodium carbonate, potassium carbonate, barium hydroxide, sodium zincate, sodium aluminate, or other alkaline salts or substances, especially such as are known to have the effect of preparing cotton and like cellulose for esterification; likewise one may employ ammonia or organic bases such as methylamine, dimethyamine, trimethylamine or tetrammonium bases, all such substances being hereinafter included within the term alkaline compounds. As before mentioned the working conditions for example of temperature, duration and concentration vary with the character of the agent used. In the case of ammonia and like agents having a weak action on cellulose the question of concentration does not matter so much, as these do not attack the cellulose molecule so much.

It is desirable in carrying out the treatment of the present invention with alkali, that one does not go too far and effect so to say the mercerization of the cellulose, as then the resistance to acetylation or esterification is even greater than before, which means that mercerization has affected the acetylation or esterification properties of the cellulose perhaps more substantially and therefore the after treatment with acid is still more necessary. This is also a reason why the alkali treatment with higher concentrations is not so good as that with lower concentrations.

Mechanical wood pulp usually requires more drastic treatment than chemical wood pulps to bring it into the required condition for satisfactory acetylation, esterification or etherification, i. e. it requires repeated or long continued boiling or treatment with the alkali or similarly acting agents. In the case of mechanical wood pulp or wood or other cellulosic materials which have not yet been treated according to the known methods for preparing chemical wood pulp, it is of course necessary to eliminate or substantially eliminate the ligno cellulose and constituents such as pentosan or resins. This may be done preferably separately, before the treatment of the present invention, or, less advantageously, by combining known processes of extracting such constituents from the wood or cellulosic materials with the present process.

As before mentioned the invention may be applied to any sulphite pulps, soda pulps, sulphate pulps, mechanical wood pulps or any other wood pulps or like cellulosic materials. It is preferable to employ pulps which have been produced or prepared by treatment at low pressure or no pressure or with open boil.

While the invention applies principally to pulps obtained from chemical treatments of wood, bamboo, reeds, esparto and other grasses and like cellulosic materials, and to mechanical pulps obtained by pulping wood or other cellulosic materials by so-called mechanical pulp processes, the invention may also be applied to the raw woods or cellulosic materials. In the latter case the ligno cellulose and resins must be eliminated or substantially eliminated from the raw cellulosic materials, which, as before mentioned is preferably done separately before the special treatment of the invention, but may be done, though less advantageously, by combining known processes of extracting such constituents from the wood or cellulosic material with the special treatment of the invention.

It has also been found that cotton cellulose, such for example as cotton, cotton paper, cotton linters, and so forth, can itself be materially improved for acetylation or other esterification, or for etherification, by subjecting it to the treatment with caustic alkali or similarly acting agents and subsequent acid treatment as herein described, and the invention likewise includes such treatment of cotton cellulose.

As before mentioned, the invention has in view especially the application of the treated wood pulps or other cellulosic materials or the treated cotton cellulose, in and for the manufacture of cellulose acetates, and it is to be understood that the invention includes broadly processes for the production of cellulose acetates in which such treated cellulosic materials or treated cellulose are subjected to acetylation.

The acetylation may be conducted according to any known or suitable process, and preferably according to processes wherein the cellulose is treated with acetic anhydride in the presence of acetic acid or other solvents or diluents, and with the aid of sulphuric acid or other catalyst at suitably controlled temperatures. Of especial value is the process described in my prior British Patent No. 207,562 or my U. S. specification Serial No. 633,016 filed 18 April 1923 wherein the cellulose is acetylated in the presence of quantities of acetic acid or equivalent solvent which are at least six times the weight of the cellulose, acetic anhydride being used as acetylating agent together with sulphuric acid or other strong condensing agent. The acetylation mixture is preferably cooled initially to a temperature of about 0–5° C. and the temperature is allowed to rise during the progress of the acetylation to a maximum not exceeding 35° C. and usually somewhat lower. The acetylation is preferably performed in solution in glacial acetic acid or other suitable solvent of the cellulose acetate, or it may be performed in suspension by conducting the acetylation in presence of benzol or other non-solvent in absence of a solvent or in presence of glacial acetic acid or other solvent together with sufficient non-solvent to prevent the cellulose acetate from going into solution, as explained for instance in my said British Patent No. 207,562 or in my said U. S. specification S. No. 633,016.

The invention likewise includes the application of the treated wood pulps or other cellulosic materials, or the treated cotton cellulose in and for the production of other fatty acid or other organic acid esters of cellulose, viscose, ethyl, methyl, benzyl cellulose and other alkyl or aralkyl ethers of cellulose, and nitro cellulose or other inorganic esters of cellulose.

The following are some examples illustrating how the invention may be carried out, it being understood that these are only given by way of example and can be varied widely within the spirit of the invention.

*Example 1.*

100 parts by weight of sulphite pulp, soda pulp, sulphate pulp or like wood pulp are boiled for about one to two hours under atmospheric pressure with a solution of caustic soda of ¼ to 2½% strength in a proportion of about 20–30 times weight of liquid relatively to the weight of pulp treated and preferably while stirring or agitating. If desired, the boiling may be repeated with a second similar lot of caustic alkali solution, though this is not essential. After the alkali treatment the material, preferably after washing, is heated at about 80° to 100° C. with glacial acetic acid for about one to three hours. The material may then be separated from the acid and employed for the production of cellulose acetates or other esters, ethers or derivatives of cellulose such as referred to, or for the production of cellulose acetates the mixture of treated pulp and acetic acid may be taken direct for acetylation after adjusting the amount of acetic acid if necessary to that required for the acetylation operation. That is to say for example the mixture of treated pulp and acetic acid (the latter adjusted in quantity if necessary) may receive the addition of acetic anhydride or other acetylating agent and sulphuric acid or other condensing agent for the acetylation. It will give clear acetylation solutions, just as viscous as those obtainable under similar conditions of acetylation with cotton cellulose.

*Example 2.*

100 parts by weight of sulphite pulp, soda pulp, sulphate pulp or like wood pulp are treated with an excess of a 15% to 20% solution of caustic soda in the cold for about two to four hours, using for example about 20–30 times weight of the solution relatively to the weight of the pulp, and preferably stirring constantly. The treated pulp, preferably after washing, is subjected to treatment with glacial acetic acid similarly to that of Example 1, and it is then found that the product is rendered similarly suitable for acetylation, in spite of the fact that it has been found that if one endeavoured to use the wood pulp resulting from the treatment with the concentrated alkali solution as such for acetylation it would be found more resistant to acetylation than before. However, as before mentioned, the treatment with the higher concentrations of alkali is not so advantageous from various points of view as that with low concentrations.

The caustic alkali concentrations preferably employed range from about ¼% to about 3%, and especially about ¼% to about 1%. The liquor will be used in suitable quantity usually not less than about 20 times the weight of the wood pulp or cellulosic material to be treated. Less than this amount of liquor may however be used, though not so advantageously as it is much better to have the pulp or cellulosic material so that it can be easily moved or stirred.

When mechanical wood pulp or other cellulosic materials are taken from which ligno cellulose, resin or like constituents naturally present in the material have not been removed prior to treatment with alkali and acid according to the invention, and when the removal of these constituents is effected in a combined process with the alkali and subsequent acid treatment of the invention, the alkali employed for the combined purpose of removing or substantially removing the said constituents and of bringing the cellulose of the material into the desired condition for giving the reactive cellulose when treated with the acid, should be so chosen as to have the necessary excess of alkali available for the latter purpose over and above that required for removing or substantially removing said constituents.

What I claim and desire to secure by Letters Patent is:—

1. A process for treating cellulosic material which comprises treating said material with a solution of an alkaline compound, and then treating it with a lower fatty acid, thereby producing a cellulose which is uniformly esterifiable to fatty acid esters.

2. A process for treating cellulosic material which comprises treating said material with a solution of caustic alkali, and then treating it with acetic acid, thereby producing a cellulose which is uniformly esterifiable to fatty acid esters.

3. A process for treating cellulosic material which comprises treating said material with a solution of an alkaline compound to effect the substantial elimination of ligno cellulose, resins, and other impurities, and then treating it with a lower fatty acid, thereby producing a cellulose which is uniformly esterifiable to fatty acid esters.

4. A process for treating cellulosic material which comprises treating said material with a solution of an alkaline hydroxide to effect the substantial elimination of ligno cellulose, resins, and other impurities, and then treating it with a lower fatty acid, thereby producing a cellulose which is uniformly esterifiable to fatty acid esters.

5. A process for treating cellulosic material which comprises treating said material with a solution of caustic alkali to effect the substantial elimination of ligno cellulose, resins, and other impurities, and then treating it with a lower fatty acid, thereby producing a cellulose which is uniformly esterifiable to fatty acid esters.

6. A process for treating wood pulp which comprises treating said wood pulp with a solution of an alkaline compound to effect the substantial elimination of ligno cellulose, resins, and other impurities, and then treating it with a lower fatty acid to produce a cellulose which is uniformly esterifiable to fatty acid esters.

7. A process for treating wood pulp which comprises treating said wood pulp with a solution of an alkali to effect the substantial elimination of ligno cellulose, resins, and other impurities, and then treating it with acetic acid to produce a cellulose which is uniformly acetylizable.

8. A process for treating wood pulp which comprises treating said wood pulp with a solution of caustic alkali to effect the substantial elimination of ligno cellulose, resins, and other impurities, and then treating it with acetic acid to produce a cellulose which is uniformly esterifiable to fatty acid esters.

9. A process for treating soda pulp which comprises treating said soda pulp with a solution of caustic soda to effect the substantial elimination of ligno cellulose, resins, and other impurities, and then treating it with glacial acetic acid to produce a cellulose which is uniformly acetylizable.

10. A process for treating cellulosic material which comprises treating said material with a solution of an alkaline compound of not more than about 20% concentration, at a temperature of from ordinary temperature up to boiling temperature, and then treating it with a lower fatty acid at temperatures ranging from ordinary temperature up to boiling temperature, thereby producing a cellulose which is uniformly esterifiable to fatty acid esters.

11. A process for treating cellulosic material which comprises treating said material with a solution of an alkaline compound of not more than about 20% concentration, at a temperature of from ordinary temperaure up to boiling temperature, and then treating it with acetic acid at temperatures ranging from ordinary temperature up to boiling temperature, thereby producing a cellulose which is uniformly acetylizable.

12. A process for treating cellulosic material which comprises treating said material with a solution of caustic alkali of not more than about 20% concentration, at a temperature of from ordinary temperature up to boiling temperature, and then treating it with acetic acid at temperatures ranging from ordinary temperature up to boiling temperature, thereby producing a cellulose which is uniformly esterifiable to fatty acid esters.

13. A process for treating cellulosic material which comprises treating said material with a solution of caustic alkali of from about ¼% to about 3% concentration at a temperature of from ordinary temperature up to boiling temperature, and then treating it with acetic acid at a temperature of from ordinary temperature up to boiling temperature, thereby producing a cellulose which is uniformly acetylizable.

14. A process for treating wood pulp which comprises treating said wood pulp with a solution of an alkaline compound of not more than about 20% concentration, at a temperature of from ordinary temperature up to boiling temperature, and then treating it with a lower fatty acid at a temperature of from ordinary temperature up to boiling temperature, thereby producing a cellulose which is uniformly esterifiable to fatty acid esters.

15. A process for treating wood pulp which comprises treating said wood pulp with a solution of alkali of not more than about 20% concentration, at a temperature of from ordinary temperature up to boiling temperature, and then treating it with a lower fatty acid at a temperature of from ordinary temperature up to boiling temperature, thereby producing a cellulose which is uniformly esterifiable to fatty acid esters.

16. A process for treating wood pulp which comprises treating said wood pulp with a solution of alkali of not more than about 3% to 10% concentration, at a temperature of from ordinary temperature up to boiling temperature, and then treating it with a lower fatty acid at a temperature of from ordinary temperature up to boiling temperature, thereby producing a cellulose which is uniformly esterifiable to fatty acid esters.

17. A process for treating wood pulp which comprises boiling said wood pulp with a solution of caustic alkali of from about ¼% to about 3% concentration, and then treating it with a lower fatty acid at a temperature of from ordinary temperature up to boiling temperature, thereby producing a cellulose which is uniformly esterifiable to fatty acid esters.

18. A process for treating wood pulp which comprises repeatedly boiling said wood pulp with a solution of caustic alkali of from about ¼% to about 3% concentration, and then treating it with acetic acid at a temperature of from ordinary temperature up to boiling temperature, thereby producing a cellulose which is uniformly acetylizable.

19. A process for treating wood pulp which comprises boiling said wood pulp with a solution of caustic alkali of from about ¼% to about 3% concentration, and then treating it with glacial acetic acid at a temperature of about 80–100° C., thereby producing a cellulose which is uniformly acetylizable.

20. A process for treating cellulosic material which comprises treating said material with a solution of an alkaline compound and then with a lower fatty acid, thereby producing a cellulose which is uniformly esterifiable to fatty acid esters, and subjecting the resulting cellulose to the action of an esterifying medium for the production of fatty acid esters.

21. A process for treating cellulosic material which comprises treating said material with a solution of caustic alkali and then with a lower fatty acid, thereby producing a cellulose which is uniformly esterifiable to fatty acid esters, and subjecting the resulting cellulose to the action of an esterifying medium for the production of fatty acid esters.

22. A process for treating cellulosic material which comprises treating said material with a solution of an alkaline compound and then with a lower fatty acid, thereby producing a cellulose which is uniformly acetylizable, and subjecting the resulting cellulose to the action of an acetylating medium.

23. A process for treating cellulosic material which comprises treating said material with a solution of caustic alkali and then with acetic acid, thereby producing a cellulose which is uniformly acetylizable, and subjecting the resulting cellulose to the action of an acetylating medium.

24. A process for treating wood pulp which comprises treating said wood pulp with a solution of caustic alkali to effect the substantial elimination of ligno cellulose, resins, and other impurities, and then treating with acetic acid to produce a cellulose which is uniformly acetylizable, and subjecting the resulting cellulose to the action of an acetylating medium.

25. A process for treating chemical wood pulp which comprises treating said wood pulp with a solution of caustic alkali to effect the substantial elimination of ligno cellulose, resins, and other impurities, and then treating with acetic acid to produce a cellulose which is uniformly acetylizable, and subjecting the resulting cellulose to the action of an acetylating medium.

26. A process for treating chemical wood pulp which comprises boiling said wood pulp with a solution of caustic alkali of from about ¼% to about 3% concentration until the substantial elimination of ligno cellulose, resins, and other impurities has been effected, and then heating with glacial acetic acid until the resulting cellulose is uniformly acetylizable, and subjecting the resulting cellulose to the action of an acetylating medium.

In testimony whereof I have hereunto subscribed my name.

HENRY DREYFUS.